United States Patent [19]

Langer

[11] Patent Number: 5,059,637

[45] Date of Patent: Oct. 22, 1991

[54] ENDOTHERMIC FIRE PROTECTIVE MATERIAL

[75] Inventor: Roger L. Langer, Troy Township, St. Croix County, Wis.

[73] Assignee: Minnesota Mining and Manufacturing Company, Saint Paul, Minn.

[21] Appl. No.: 701,197

[22] Filed: May 16, 1991

Related U.S. Application Data

[63] Continuation of Ser. No. 581,399, Sep. 11, 1990, abandoned, which is a continuation of Ser. No. 172,218, Mar. 23, 1988, abandoned, which is a continuation-in-part of Ser. No. 5,945, Jan. 22, 1987, abandoned.

[51] Int. Cl.$^5$ .............................................. C09K 21/14
[52] U.S. Cl. ...................................... 523/179; 521/83; 521/91; 521/92; 521/100; 521/122; 521/135; 521/136; 521/137; 521/138; 521/906; 521/907
[58] Field of Search .................... 523/179; 521/83, 91, 521/92, 100, 122, 135, 136, 137, 138, 907, 906

[56] References Cited

U.S. PATENT DOCUMENTS

| | | | |
|---|---|---|---|
| 2,594,937 | 4/1952 | Lauing | 523/179 |
| 3,755,223 | 8/1973 | Engel | 523/179 |
| 3,849,178 | 11/1974 | Feldman | 117/72 |
| 4,189,619 | 2/1980 | Pedlow | 114/48 |
| 4,363,199 | 12/1982 | Kucheria et al. | 52/221 |
| 4,442,157 | 4/1984 | Marx | 523/179 |
| 4,595,714 | 6/1986 | McAllister et al. | 523/179 |
| 4,600,634 | 7/1986 | Langer | 428/220 |

*Primary Examiner*—Morton Foelak
*Attorney, Agent, or Firm*—Gary L. Griswald; Walter N. Kirn; Gregory A. Evearitt

[57] ABSTRACT

A water-base endothermic fire protective material comprising a heat curable thermosetting resin, inorganic fibers, an endothermic inorganic filler, and thermoplastic binder resin is disclosed. The material can vary in viscosity from a putty that is moldable or trowelable into place to a thin paste that can be sprayed to form a flexible and stable fire stop seal or coating. The material with essentially no shrinkage retains strength and adhesion qualities before and after exposure to fire and retains superior resistance to the impact, erosion, and cooling effects of a hose stream used to combat a fire.

5 Claims, No Drawings

ENDOTHERMIC FIRE PROTECTIVE MATERIAL

RELATED APPLICATIONS

This is a continuation of application Ser. No. 07/581,399 filed Sept. 11, 1990 which is a continuation of Ser. No. 172,218 filed Mar. 23, 1988 both abandoned which is a continuation-in-part of Ser. No. 005,945 filed Jan. 22, 1987 now abandoned.

BACKGROUND OF THE INVENTION

The present invention relates to a water-based endothermic fire protective material comprising a heat curable thermosetting resin, inorganic fibers, endothermic inorganic filler and thermoplastic resin which is particularly useful for fire stopping purposes.

In commercial buildings, electrical cables, electric cable trays and telephone cable trays pass through penetrations in walls, floors and ceilings. The penetrations for these members are necessarily somewhat larger than the members themselves. In the event of a fire, it is possible for flames, heat and smoke to pass through these penetrations thereby spreading the fire and smoke.

The possibility of fires in areas with high concentrations of instrument and communication wires as well as power transmission cables is of great concern in automated industrial plants. Communications and power cables are manufactured with combustible electrical insulation sheaths which can provide a fuel pathway to enable a fire to spread. Although floors, walls and ceilings serve as a discrete barrier to contain a fire in a room, such fires need to be arrested by properly designed fire protective materials placed not only around the cable runs but also for use in filling the gaps and interfaces in the penetrations. In this manner the fire can be contained to permit an orderly shutdown to isolate the system and extinguish the fire with minimal spread and damage.

Cable and communications systems manufacturers are acutely aware of the problem and have directed considerable research efforts towards developing systems characterized by low flame spread and particularly lower fuel load. There are a number of methods described in the patent prior art relating to the sealing of the openings around pipes and cable members. Silicone foams have been used but have the difficulty of position retention until the foam is set. Other means include stuffing the penetration with inorganic fibers. However, these fiber batts do not always stay in place and can be easily dislodged.

Compositions employing char-forming, endothermic, intumescent, and/or sublimation reactions from the heat from fires are disclosed in various forms. For example, U.S. Pat. No. 3,849,178 discloses a subliming and endothermic phase change coinciding with an intumescent char-former when exposed to fires. The active components and binders in this composition must be thermoplastic and soften or melt to carry out the sublimation endothermic outgasing process in order to be effective. U.S. Pat. No. 4,189,619 discloses compositions containing fusing ceramic, hydrous metal oxides, intumescent solids, and binder solids which are thermoplastic resins. U.S. Pat. No. 4,363,199 also uses hydrous metal oxides along with a substantial amount of an inorganic binder, colloidal silica, acting as a refractory adhesive when exposed to high temperatures. In U.S. Pat. No. 4,600,634, highly filled endothermic fibrous sheet materials utilizing minimal amounts of resinous binders that are also thermoplastic are disclosed. Utilizing formulations in which the fusible ceramic solids are activated during a fire and fuse at 700°-1500° F. temperature range (U.S. Pat. No. 4,189,619) or where the colloidal silica is fused at high temperatures to increase its strength during a fire (U.S. Pat. No. 4,363,199) limits the amount of active ingredients (e.g., subliming, endothermic, intumescent) that can be used because the relatively large amounts of inorganic thermally fusible material comprises a significant portion of the compositions.

SUMMARY OF THE INVENTION

The present invention relates to water-based endothermic fire protective materials capable of withstanding prolonged flame and heat exposure and having improved resistance to degradation during the subsequent impact, erosion, and cooling effects of a hose stream.

These results are achieved through the incorporation of an effective amount of a heat curable thermosetting resin into an otherwise thermoplastic flexible fire protective material wherein the heat curable thermosetting resin hardens and strengthens the unexposed, unfired portion of the material during exposure to a fire.

DETAILED DESCRIPTION OF THE INVENTION

The water-based endothermic fire protective material of this invention comprises about 1-10% dry weight of a non-halogenated heat curable thermosetting resin, about 5-20% dry weight of a non-halogenated thermoplastic binder resin, about 60-90% dry weight inorganic endothermic filler material, and about 1-5% dry weight of inorganic fibrous material. Wetting agents, dispersants, thickeners and defoamers as well as intumescent materials may also be included in the compositions of this invention. The material can vary in viscosity from a putty that is hand moldable or trowelable to a "paint" that could be sprayed onto a substrate to form a fire protective coating. The viscosity can be easily modified by varying the water content and making minor adjustments to the processing aids (dispersants, thickeners, defoamers, wetting agents) of the present invention.

Suitable heat curing thermosetting resins which can be employed include liquid or solid epoxy resins, polyester resins, phenolic resins, polyurethane resins, vinyl ester resins and the like.

Suitable binder resins can include various polymers and elastomers in latex form, such as, natural rubber latex, polyvinyl acetate latices, styrene-butadiene latices, butadiene acrylonitrile latices, and latices of acrylate and methacrylate polymers and copolymers (e.g., polymethyl acrylate, polyethyl acrylate, and polymethyl methacrylate). Halogen-free polymers are preferred to avoid the release of noxious and corrosive halogen gases upon decomposition during a fire. Acrylic polymers are preferred because of their excellent heat resistance, aging properties, and noncorrosive combustion products.

The inorganic endothermic filler material is preferably a powder having a mean particle size less than 60 micrometers, more preferably about 12 micrometers. Such particle size allows the filler load to be maximized while still maintaining desirable physical properties. Typical filler materials may be hydrated metal oxides and borates. The filler should be relatively insoluble in water, chemically inert and should not require a synergist. Alumina trihydrate, magnesium hydroxide (hydrated magnesia) and zinc borate possess these properties. Alumina trihydrate is presently preferred.

Inorganic fibrous materials useful in the present invention must be dispersible in the latex binder resin and must not agglomerate the other solid components of the compositions. Especially useful as the inorganic fibrous component is fiberglass in a length of 3 mm and a diameter of 14 micrometers, although other lengths and diameters are also useful.

EXAMPLE 1

A laboratory sized (approximately 2 liters) sample was prepared in the following manner: 571 grams of acrylic resin latex obtained as Rhoplex HA-8 latex, 10 grams of a wetting agent obtained as Triton X-405, 5 grams of a dispersant obtained as Tamol 850. All of the above, obtained from Rohm & Haas Company, and 150 grams of water were mixed in a Model N-50 Hobart mixer at slow speed using the "B" Flat Beater blade. 53 grams of Scotchcast 265 epoxy resin powder obtained from 3M and 1750 grams of alumina trihydrate obtained as Techfill A212 from Great Lakes Minerals Company were slowly added and mixed into the above mixture 55 grams of wet 3 mm long, 14 micron diameter fiberglass obtained as Chop-Pak A205 (contains 17% water) obtained from Manville Corporation was added, followed by 5 grams of hydroxypropyl methylcellulose thickener obtained as Methocel K4M from Dow Chemical Company, followed by 10 grams of a 50% solution defoamer obtained as Foamaster DF-160L from Napco Chemical Company. The fire protective composition so prepared has a wet density of about 13.5 to 14.5 lb/gal (1.62 to 1.74 gm/cc), Semco caulk rate ($\frac{1}{8}$" orifice at 50 psi) of about 200 to 1200 gm/min, drying shrinkage of not more than about 5% by volume, and displays excellent adhesion to materials such as concrete, steel, and aluminum, and displays good flexibility in the dried state.

A 980° C. hot side test was performed on the sample to observe the endothermic nature (time vs temperature rise) of the composition. The fired sample was subsequently subjected to an air blast erosion test to quantify the strengthening effect of the heat curable thermosetting resin in the composition. This test consists of forming the composition, 380 mm thick into a 500 mm diameter hole bored into a K-3000 fire brick which was presized to fit a 12 cm × 10 cm door cavity of Blue "M" Model M15A-2A muffle furnace. A thermocouple was centrally located in the test specimen before drying for 15 hours at 75° C., then 2 hours at 105° C. and cooled to ambient temperature before testing. The brick test sample was inserted into the door opening of the 980° C. preheated furnace. Time vs. temperature rise was recorded during heating until the thermocouple temperature reached 540° C., at which time the brick was removed and cooled. The fired side of the sample was then eroded with an air blast from a 4.5 mm orificed air nozzle set at 30 psi. The air pressure erosin weight loss was determined.

COMPARATIVE EXAMPLE AND EXAMPLES 2-5

A comparative Example C wherein no heat curable thermosetting resin was used and additional Examples 2-5 according to the present invention with varying amounts and types of heat curable thermosetting resins were prepared as above. Test results of each of the Examples in the above described tests are shown in Table 1.

TABLE 1

| ENDOTHERMIC MATERIAL COMPOSITION (dry weight percent) | | | | | | |
|---|---|---|---|---|---|---|
| Example | C | 1 | 2 | 3 | 4 | 5 |
| Acrylic resin solids | 14.7 | 12.2 | 9.7 | 7.2 | 13.9 | 12.2 |
| Epoxy resin powder | 0 | 2.5 | 5.0 | 7.5 | 10.0 | — |
| Phenolic resin (Varcum 29-592, BTL Specialty Resin Co.) | — | — | — | — | — | 2.5 |
| Process Additives | 0.9 | 0.9 | 0.9 | 0.9 | 1.1 | 0.9 |
| Total organic material | 15.6 | 15.6 | 15.6 | 15.6 | 25.0 | 15.6 |
| Fiber Glass | 2.1 | 2.1 | 2.1 | 2.1 | 2.4 | 2.1 |
| Alumina trihydrate | 82.3 | 82.3 | 82.3 | 82.3 | 72.6 | 82.3 |
| Time to 540° C. (min) | 80 | 82 | 82 | 78 | 74 | 82 |
| Air Erosion Material Loss (%) | 52.2 | 41.1 | 18.4 | 6.6 | 0.3 | 31.3 |

Examples 1-5 in Table 1 show a dramatic reduction in air eroded material loss achieved through the addition of small amounts of heat curable thermosetting resin without a significantly deleterious effect on the endothermic nature (temperature rise) of the material until about a greater than 10 dry weight percent was reached. Example 1 was compared for endothermic value to commercially available fire protective materials Carborundum Fiberfrax Fyre Putty and Thomas-Betts Flame-safe FST-601. The materials were dried and tested using a DuPont 1090B, Cell Base 912, Differential Scanning Calorimeter. The heat flow measurements were made in a nitrogen atmosphere and at a temperature rate increase of 15° C./minute to about 600° C. The value obtained for Example 1 was 776 Joules/g whereas for Fiberfrax putty it was 252 Joules/g and for FST-601 it was 361 Joules/g. These results reveal a vast performance advantage for the compositions of this invention.

The fired test samples were prepared by utilizing a 90 cm × 90 cm × 10 cm concrete slab with four 10 cm diameter holes. Fire protective compositions were filled into holes flush to the top surface for a depth of 2.5 cm using cardboard cutouts as the damming device. The slab was then placed over a furnace fueled with propane and heated to about 93° C. for 4 days to dry the compositions. Cooled (to room temperature) test samples were then heated according to ASTM E-119 time/temperature curve for 1 hour before hose stream testing. Fire hose stream tests in accordance with ASTM E-119 (fire test samples exposed in a sweeping motion to a hose stream for 13.5 seconds) were conducted on compositions of Example 1 and Comparative Example C. The hose stream was then positioned directly on the sample until water leakage or material removal occurred. The hose stream was generated by a 2.9 cm orifice nozzle at a water pressure of 30 psi and positioned at a distance of 6.1 meters. The Comparative Example test samples, were soft and hose stream blow-out was immediate upon direct spray from the nozzle after the 13.5 second sweep exposure. In contrast, the Example 1 composition test samples were very hard and could not be blown-out by continuous direct spray of the hose stream.

What is claimed is:

1. A water-based endothermic fire protective material comprising about 5 to 10 dry weight percent of an epoxy resin containing a curing agent which hardens upon exposure to heat from an external source; about 5-20 dry weight percent of a thermoplastic resin binder; about 60 to 90 dry weight percent hydrated endothermic filler; and about 1 to 5 dry weight percent inorganic fiber.

2. A water-based endothermic fire protective material according to claim 1 wherein said thermoplastic binder is acrylic polymer.

3. A water-based endothermic fire protective material according to claim 1 wherein said hydrated endothermic filler is alumina trihydrate.

4. A water-based endothermic fire protective material according to claim 1 wherein said inorganic fiber is glass fiber.

5. A water-based endothermic fire protective material according to claim 1 wherein said epoxy resin cures only upon exposure to heat in excess of 93° C. from an external source.

* * * * *